United States Patent [19]

Wang

[11] Patent Number: 5,581,304
[45] Date of Patent: Dec. 3, 1996

[54] SCREEN DETECTING SYSTEM OF A WIDE SCREEN TELEVISION FOR DETECTING BLANK TOP AND BOTTOM AREAS

[75] Inventor: Cheng-Chung Wang, Taoyuan, Taiwan

[73] Assignee: Acer Peripherals, Inc., Taoyuan, Taiwan

[21] Appl. No.: 587,258

[22] Filed: Jan. 17, 1996

[51] Int. Cl.$^6$ ........................................ H04N 5/46
[52] U.S. Cl. .................... 348/558; 348/556; 348/913
[58] Field of Search ............................ 348/445, 435, 348/913, 473, 469, 704, 739, 558, 556, 557, 555; H04N 5/46, 5/44, 5/445, 5/45

[56] References Cited

U.S. PATENT DOCUMENTS

| 5,309,234 | 5/1994 | Kranawetter et al. | 348/913 |
| 5,351,135 | 9/1994 | Saeger | 348/913 |
| 5,486,871 | 1/1996 | Filliman et al. | 348/558 |

*Primary Examiner*—Micheal H. Lee
*Attorney, Agent, or Firm*—The Kline Law Firm

[57] ABSTRACT

A screen detecting system of a wide screen television for detecting blank top and bottom areas of a video frame contained in conventional video signals and generating top and bottom display limits is disclosed. The top and bottom display limits are used by a display control system of the wide screen television to eliminate the blank top and bottom areas. The screen detecting system comprises a comparator for comparing the video signals with a blankness threshold, a sync circuit for separating vertical sync signals and horizontal sync signals from the video signals and generating a period signal after each horizontal sync signal, a blank period detector for detecting the output of the comparator within the time period of one period signal and generating a blank signal if no output is detected within said time period, and a display limit generator for generating the top display limit by checking the distribution of the blank signals after a first vertical sync signal and the bottom display limit by checking the distribution of the blank signals before a second vertical sync signal immediately after the first vertical sync signal.

7 Claims, 4 Drawing Sheets

SCREEN DETECTING SYSTEM OF A WIDE SCREEN TELEVISION FOR DETECTING BLANK TOP AND BOTTOM AREAS

BACKGROUND OF THE INVENTION

1. Field of the Invention

The present invention relates to a television device, and more particularly, to a screen detecting system of a wide screen television for detecting blank top and bottom areas of a video screen so that they can be eliminated by the wide screen television.

2. Description of the Prior Art

When wide screen televisions of aspect ratio 16:9 become more and more popular, compatibility problem for displaying the conventional 4:3 video frame of the NTSC system over a 16:9 display screen are commonly realized by many wide screen television vendors. Please refer to FIGS. 1A to 1C. FIG. 1A shows a conventional 4:3 video frame 10. Frame 10 is divided into three areas, a central area 11 of aspect ratio 16:9 for displaying 16:9 movies, a top area 12 and a bottom area 13 for displaying messages or logo occasionally. Such arrangement is commonly seen in cable television channels for displaying 16:9 movies in a 4:3 display screen. Inside the central area 11 a round circle 14 is displayed. FIG. 1B shows a 16:9 video frame 15 generated by using one prior art method. Frame 15 is generated by enlarging the video frame 10 horizontally. All the areas 11 to 13 are kept but the round circle 14 becomes an ellipse. FIG. 1C shows another 16:9 video frame 16 generated by the other prior art method which eliminates both the top and bottom areas 12 and 13 of the frame 10 and keeps only the central area 11. This method allows a true-copy display of the central area in exactly 16:9 aspect ratio but anything displayed in the top area 12 or bottom area 13 will totally be eliminated. Besides, if the video frame 10 displays a 4:3 image instead of a 16:9 movie, the image displayed on the top and bottom areas 12 and 13 will also be eliminated.

SUMMARY OF THE INVENTION

It is therefore a primary objective of the present invention to provide a wide screen television which can flexibly eliminate the blank top and bottom areas of a video frame contained in conventional video signals without cutting off any message or image displayed in the top and bottom areas.

Briefly, in a preferred embodiment, the present invention includes a wide screen TV (television) comprising:

(1) a 16:9 display screen;

(2) a display control system for displaying video signals of 4:3 video frame of conventional video signals in full scale over the display screen with parts of the video frame above a top display limit and under a bottom display limit been eliminated; and (3) a screen detecting system for detecting blank top and bottom areas of the video frame and generating the top and bottom display limits comprising:

(a) a comparator for comparing the video signals with a predetermined blankness threshold and generating a positive output if any of the video signals is higher than the threshold, (b) a sync circuit for separating vertical sync signals and horizontal sync signals from the video signals and generating a period signal after each horizontal sync signal, (c) a blank period detector for detecting the output of the comparator within the time period of one period signal and generating a blank signal if no positive output is detected within said time period, and (d) a display limit generator for generating the top display limit by checking the distribution of the blank signals after a first vertical sync signal and the bottom display limit by checking the distribution of the blank signals before a second vertical sync signal immediately after the first vertical sync signal.

It is an advantage of the present invention that the wide screen television comprises a screen detecting system for detecting the blank top and bottom areas of a 4:3 video frame contained in conventional video signals for the display control system so that it can eliminate only the blank top and bottom areas when displaying the 4:3 video frame over the 16:9 display screen of the wide screen television.

DETAILED DESCRIPTION OF THE PREFERRED EMBODIMENT

Figure 2:
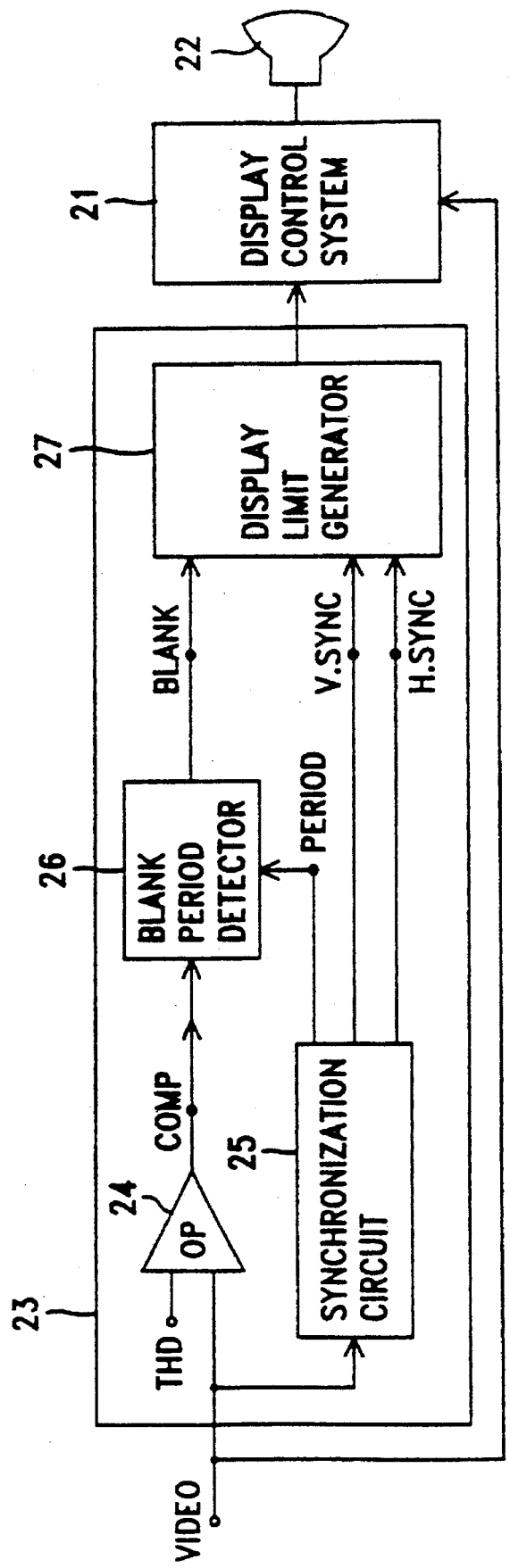
FIG. 2 is a block diagram of part of a wide screen television.
Figure 3:
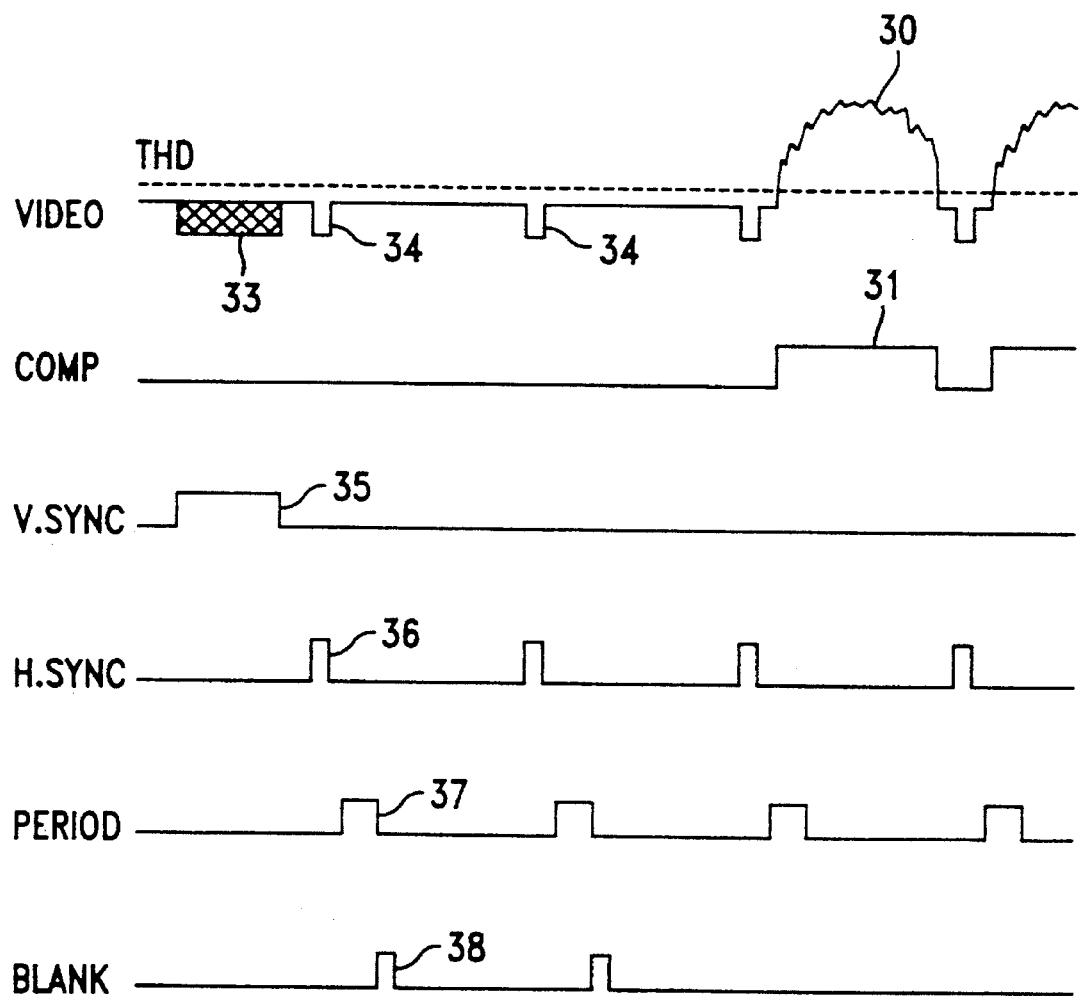
FIG. 3 is a timing diagram of FIG. 2.

Please refer to FIGS. 2 and 3. FIG. 2 is a block diagram of part of a wide screen television and FIG. 3 is a timing diagram of FIG. 2. FIG. 2 shows a wide screen TV comprising:

(1) a 16:9 display screen 22;

(2) a display control system 21 for displaying video signals of 4:3 video frame of conventional video signals in full scale over the display screen 22 with parts of the video Frame above a top display limit and under a bottom display limit been eliminated; and (3) a screen detecting system 23 for detecting blank top and bottom areas of the video frame and generating the top and bottom display limits comprising:

(a) a comparator 24 for comparing the video signals with a predetermined blankness threshold THD and generating a positive output over port COMP if any of the video signals is higher than the threshold THD, (b) a sync circuit 25 for separating vertical sync signals and horizontal sync signals from the video signals over ports V. SYNC and H. SYNC and generating a period signal over port PERIOD after each horizontal sync signal, (c) a blank period detector 26 for detecting the output of the comparator 24 within the time period of one period signal and generating a blank signal over port BLANK if no positive output is detected within said time period, and (d) a display limit generator 27 for generating the top display limit by checking the distribution of the blank signals after a first vertical sync signal and the bottom display limit by checking the distribution of the blank signals before a second vertical sync signal immediately after the first vertical sync signal.

Video signals are inputted from port VIDEO and compared with a predetermined blankness threshold THD by the comparator 24 which is an operational amplifier. Outputs of the comparator 24 are generated over port COMP. FIG. 3 shows that a positive output 31 will be generated at port COMP if the video signal 30 is higher than the threshold THD. The video signals inputted from port VIDEO comprise both vertical synchronization signal 33 and horizontal synchronization signals 34 in it. The sync circuit 25 can separate these synchronization signals from the video signals to produce a vertical sync signal 35 for each vertical synchronization signal 33 over port V.SYNC and a horizontal sync signal 36 for each horizontal synchronization signal 34 over port H. SYNC. The sync circuit 25 also generates a period signal 37 over port PERIOD after each horizontal sync signal 36. The blank period detector 26 detects the output of the comparator 24 within the time period of each period signal 37 and generates a blank signal 38 over port BLANK if no positive output is detected within the time period of one period signal 37. That means there is no video image contained in the video signals during this time period. The display limit generator 27 will use outputs from the blank period detector 26 and the sync circuit 25 to determine the top and bottom display limits for the display control system 21 to eliminate the blank top and bottom areas on a conventional 4:3 video frame.

Figure 4:
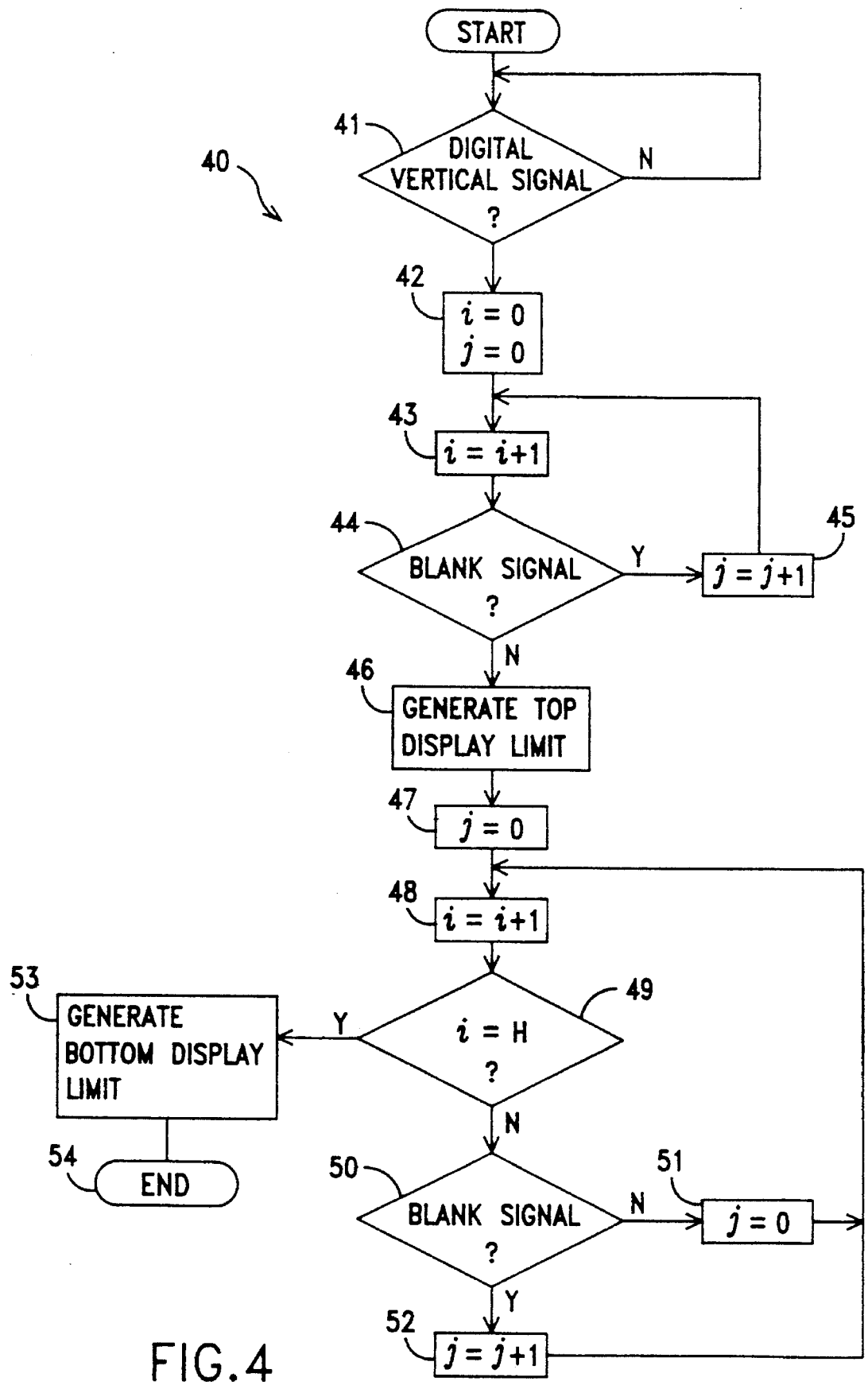
FIG. 4 is one process used by the display limit generator shown in FIG. 2 for determining the top and bottom display limits.
Figure 5:
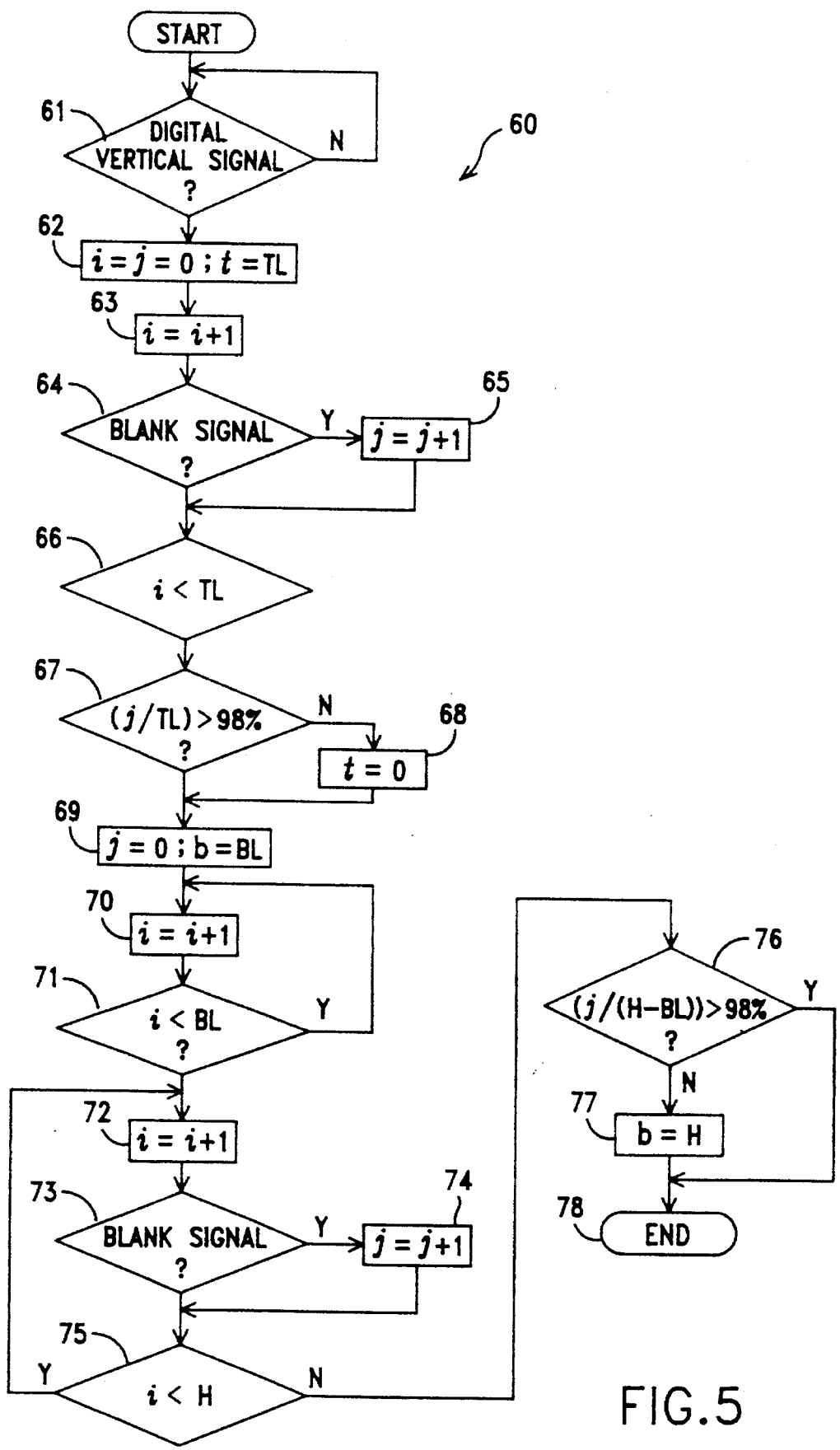
FIG. 5 is another process used by the display limit generator for determining the top and bottom display limits.

The display limit generator 27 can be implemented by using a small microprocessor. It checks the blank signals after a first V-SYNC signal for determining the top display limit and the blank signals before a second V-SYNC signal immediately following the first V-SYNC signal for determining the bottom display limit. Two different methods can be used for determining the top display limit and bottom display limit and are illustrated in FIGS. 4 and 5 separately. The first method counts the number of consecutive blank signals after a first vertical sync signal to generate the top display limit and the number of consecutive blank signals before a second vertical sync signal to generate the bottom display limit. This method can exactly identify the blank periods existed over the top and bottom parts of a 4:3 video frame contained in video signals so that the display control system 21 can accurately eliminate the blank top and bottom areas when displaying the video signals in the display screen 22.

FIG. 4 shows a process 40 used by the display limit generator 27 for determining the top and bottom display limits. The number of horizontal sync signals between two vertical sync signals is equal to H. Variable i represents the number of horizontal sync signals received and variable j represents the number of blank signals detected. The process comprises the following steps:

| | |
|---|---|
| step 41 | wait until a first vertical sync signal; |
| step 42 | set i = 0; |
| | set j = 0; |
| step 43 | set i = i + 1 for each horizontal sync signal; |
| step 44 | check blank signal; go to step 46 if not found; |
| step 45 | set j = j + 1 if a blank signal is found; go to step 43; |
| step 46 | generate the top display limit by using the variable j; |
| step 47 | set j = 0; |
| step 48 | set i = i + 1 for each horizontal sync signal; |

-continued

| | |
|---|---|
| step 49 | go to step 53 if i = H; |
| step 50 | check blank signal; go to step 52 if found; |
| step 51 | set j = 0; go to step 48; |
| step 52 | set j = j + 1; go to step 48; |
| step 53 | generate the bottom display limit by using the variable j; |
| step 54 | end. |

Figure 1A:
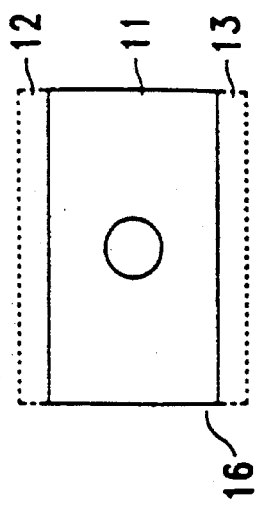
FIG. 1A shows a conventional 4:3 video frame.
Figure 1B:
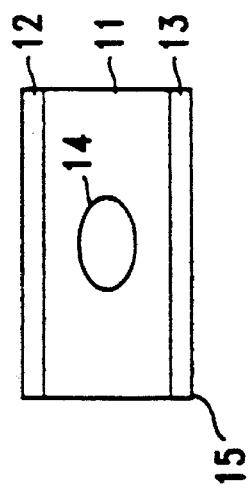
FIG. 1B shows a 16:9 video frame generated by enlarging the video frame shown in FIG. 1A horizontally.
Figure 1C:
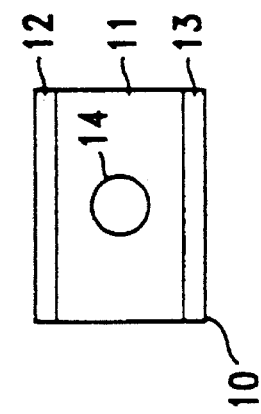
FIG. 1C shows another 16:9 video frame generated by cutting off the top and bottom parts of the video frame shown in FIG. 1A.

The other method scans the whole top area 12 and bottom area 13 to decide if there is any message or image displayed in any of these two areas. If anything exists in one area, the whole area will be displayed, or else it will not be displayed if most of the video signals in this area are blank signals. It counts the number of blank signals existed in the top area 12 and bottom area 13 to decide whether it is a blank area or not. If more than a predetermined percentage such as 98% of the video signals displayed in the top area 12 or bottom area 13 are blank signals, it will set the border between the top area 12 and the central area 11 as the top display limit or set the border between the bottom area 13 and the central area 11 as bottom top display limit. This method improves the conventional method used in FIG. 1C by cutting off only blank top or bottom areas instead of cutting off both of the areas.

FIG. 5 shows a process 60 used by the display limit generator 27 for determining the top and bottom display limits. The values of the predetermined top and bottom display limits are represented as TL and BL separately, and total number of horizontal sync signals between two vertical sync signals is represented as H. Variables t and b represent the top and bottom display limits to be determined. Variable i represents the number of horizontal sync signals received and variable j represents the number of blank signals detected. The process comprises the following steps:

| | |
|---|---|
| step 61 | wait until a first vertical sync signal; |
| step 62 | set i = j = 0; |
| | set t = TL (predetermined top display limit); |
| step 63 | set i = i + 1 for each horizontal sync signal; |
| step 64 | check blank signal after each horizontal sync signal; |
| step 65 | set j = j + 1 if one blank signal is found; |
| step 66 | go to step 63 if i < TL; |
| step 67 | check if (j/TL) >=98%; go to step 69 if yes; |
| step 68 | set t = 0 (beginning of a video frame); |
| step 69 | set j = 0; |
| | set b = BL (predetermined bottom display limit); |
| step 70 | set i = i + 1 for each horizontal sync signal; |
| step 71 | go to step 70 if i < BL; |
| step 72 | set i = i + 1 for each horizontal sync signal; |
| step 73 | check blank signal after each horizontal sync signal; |
| step 74 | set j = j + 1 if one blank signal is found; |
| step 75 | go to step 72 if i < H (end of the video frame); |
| step 76 | check if [j / (H − BL)] >= 98%; go to step 78 if yes; |
| step 77 | set b = H (bottom of the video frame); |
| step 78 | end. |

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A wide screen TV (television) comprising:

(1) a 16:9 display screen;

(2) a display control system for displaying conventional video signals of 4:3 video frame in full scale over the display screen with parts of the video frame above a top display limit and under a bottom display limit being eliminated; and (3) a screen detecting system for detecting blank top and bottom areas of the video frame and generating the top and bottom display limits comprising:
  (a) a comparator for comparing the video signals with a predetermined blankness threshold and generating a positive output if any of the video signals is higher than the threshold,
  (b) a sync circuit for separating vertical sync signals and horizontal sync signals from the video signals and generating a period signal after each horizontal sync signal,
  (c) a blank period detector for detecting the output of the comparator within a time period of said period signal and generating a blank signal if said positive output is not detected within said time period, and
  (d) a display limit generator for generating the top display limit by checking the distribution of the blank signals after a first vertical sync signal and the bottom display limit by checking the distribution of the blank signals before a second vertical sync signal immediately after the first vertical sync signal.

2. The wide screen television of claim 1 wherein the display limit generator generates the top display limit by counting the number of the blank signals generated consecutively by the blank period detector after the first vertical sync signal.

3. The wide screen television of claim 1 wherein the display limit generator generates the bottom display limit by counting the number of the blank signals generated consecutively by the blank period detector before the second vertical sync signal.

4. The wide screen television of claim 1 wherein the display limit generator generates the top display limits by using a predetermined top display limit if the number of the blank signals counted over a period between the first vertical sync signal and the predetermined top display limit are more than a predetermined percentage of the number of video signals received between the same period.

5. The wide screen television of claim 4 wherein the predetermined percentage is 98%.

6. The wide screen television of claim 1 wherein the display limit generator generates the bottom display limits by using a predetermined bottom display limit if the number of the blank signals counted over a period between the predetermined bottom display limit and the second vertical sync signal are more than a predetermined percentage of the number of video signals received between the same period.

7. The wide screen television of claim 6 wherein the predetermined percentage is 98%.

* * * * *